(12) United States Patent
Henry et al.

(10) Patent No.: US 8,879,267 B2
(45) Date of Patent: Nov. 4, 2014

(54) TRANSCEIVER ASSEMBLY

(71) Applicant: Tyco Electronics Corporation, Berwyn, PA (US)

(72) Inventors: Randall R. Henry, Harrisburg, PA (US); Michael E. Shirk, Grantville, PA (US)

(73) Assignee: Tyco Electronics Corporation, Berwyn, PA (US)

( * ) Notice: Subject to any disclaimer, the term of this patent is extended or adjusted under 35 U.S.C. 154(b) by 213 days.

(21) Appl. No.: 13/648,022

(22) Filed: Oct. 9, 2012

(65) Prior Publication Data

US 2014/0098497 A1 Apr. 10, 2014

(51) Int. Cl.
*H05K 7/20* (2006.01)
*G06F 1/20* (2006.01)

(52) U.S. Cl.
USPC ...... 361/715; 361/679.46; 361/704; 361/709; 361/710; 165/80.2; 165/80.3; 165/104.33

(58) Field of Classification Search
USPC ............... 361/679.46, 679.54, 690–697, 689, 361/704–712, 715, 719, 720, 722, 724, 816, 361/818; 165/80.2, 80.3, 104.33, 185; 257/706, 713, 718, 719; 385/92–94, 385/88, 53, 134, 141, 164, 135; 439/567, 439/607, 607.21, 608, 609, 92
See application file for complete search history.

(56) References Cited

U.S. PATENT DOCUMENTS

| | | | | |
|---|---|---|---|---|
| 6,752,663 B2 * | 6/2004 | Bright et al. | ............. | 439/607.25 |
| 6,816,376 B2 | 11/2004 | Bright et al. | | |
| 6,980,437 B2 * | 12/2005 | Bright | ............. | 361/704 |
| 7,001,217 B2 * | 2/2006 | Bright et al. | ............. | 439/607.2 |
| 7,405,931 B2 * | 7/2008 | Saturley et al. | ............. | 361/679.48 |
| 7,457,126 B2 * | 11/2008 | Ahrens | ............. | 361/716 |
| 7,539,018 B2 * | 5/2009 | Murr et al. | ............. | 361/704 |
| 7,625,223 B1 * | 12/2009 | Fogg | ............. | 439/92 |
| 7,974,098 B2 * | 7/2011 | Oki et al. | ............. | 361/715 |
| 8,081,470 B2 * | 12/2011 | Oki et al. | ............. | 361/715 |
| 8,223,498 B2 | 7/2012 | Lima | | |
| 8,345,445 B2 * | 1/2013 | Del Prete et al. | ............. | 361/804 |
| 8,449,331 B2 * | 5/2013 | Phillips et al. | ............. | 439/607.21 |
| 2009/0296351 A1 * | 12/2009 | Oki et al. | ............. | 361/709 |
| 2010/0067196 A1 * | 3/2010 | Costello et al. | ............. | 361/704 |

* cited by examiner

*Primary Examiner* — Michail V Datskovskiy

(57) ABSTRACT

A transceiver assembly includes a transceiver module having ribs and a thermal interface member on an outer surface and a receptacle assembly receiving the transceiver module. The receptacle assembly includes a heat sink and a clip coupling the heat sink to a guide frame. The heat sink has a heat sink surface facing the thermal interface member and a step extending from the heat sink surface with a module engagement surface. The ribs ride along the step during insertion into and removal from the receptacle of the transceiver module. When the ribs are longitudinally aligned with and engage the step, the module engagement surface is in an elevated position. When the ribs are longitudinally offset from the step, the module engagement surface is in a recessed position and in direct thermal engagement with the thermal interface member.

20 Claims, 5 Drawing Sheets

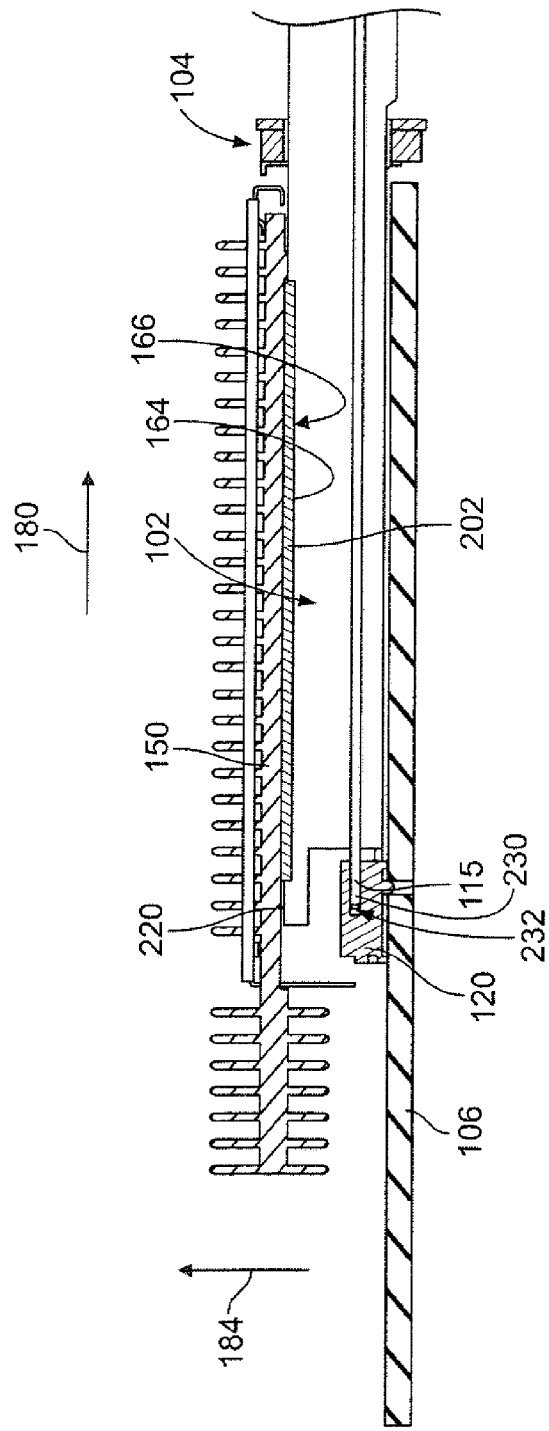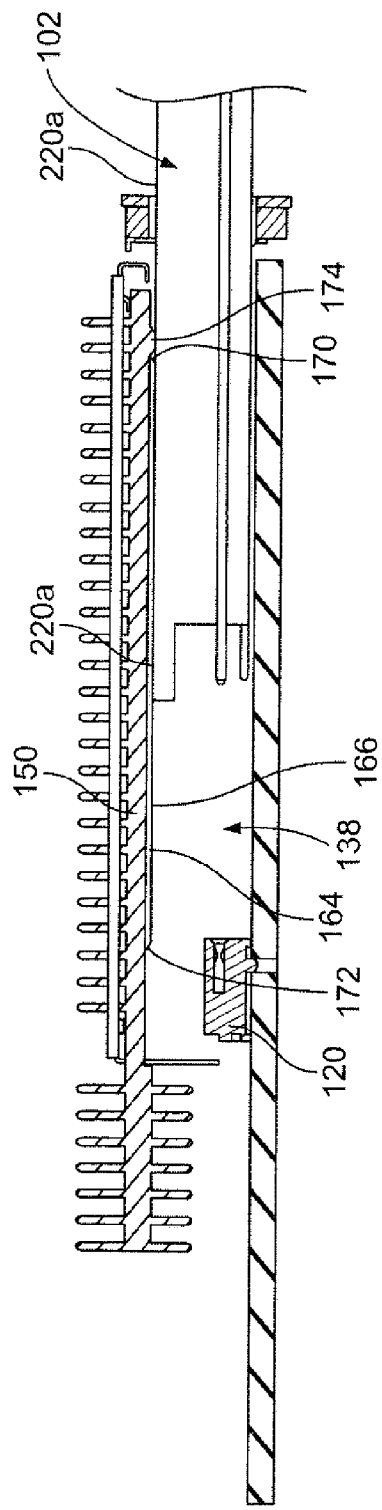

TRANSCEIVER ASSEMBLY

BACKGROUND OF THE INVENTION

The subject matter herein relates generally to an electronic transceiver assembly.

Various types of fiber optic and copper based transceivers that permit communication between electronic host equipment and external devices are known. These transceivers may be incorporated into modules that can be pluggably connected to the host equipment to provide flexibility in system configuration. The transceiver module is plugged into a receptacle that is mounted on a circuit board within the host equipment. The receptacle includes an elongated guide frame, or cage, having a front that is open to an interior space, and an electrical connector disposed at a rear of the cage within the interior space. Both the connector and the guide frame are electrically and mechanically connected to the circuit board, and when a transceiver module is plugged into a receptacle it is electrically and mechanically connected to the circuit board as well.

Known transceiver assemblies are not without problems. For instance, at increased data rates, the transceiver modules and the surrounding circuitry generate significant quantities of heat that must be removed in order for the electronic components to survive long term. Known transceiver assemblies utilize heat sinks to dissipate heat and some systems use thermal interface material at the interface between the heat sink and the transceiver module. However, during insertion and extraction of the transceiver module from the receptacle, the thermal interface material is typically damaged by scraping or wiping between the surfaces.

There is a need to improve the design of a transceiver module and heat sink in order to avoid damage to thermal interface material between the transceiver module and the heat sink.

BRIEF DESCRIPTION OF THE INVENTION

In one embodiment, a transceiver assembly is provided having a transceiver module comprising a housing having an outer surface having ribs extending therefrom. The transceiver module has a thermal interface member on the outer surface being positioned proximate the ribs. The transceiver assembly includes a receptacle assembly including a guide frame having a receptacle receiving the transceiver module in a loading direction. The receptacle extends longitudinally along the loading direction. The receptacle assembly includes a receptacle connector in the receptacle electrically coupled with the transceiver module. The receptacle assembly includes a heat sink and a clip coupling the heat sink to the guide frame. The heat sink has a heat sink surface facing the thermal interface member. The heat sink surface has a step extending from the heat sink surface. The step has a module engagement surface configured to be in direct thermal engagement with the thermal interface member. The ribs ride along the step during insertion into and removal from the receptacle of the transceiver module. When the ribs are longitudinally aligned with and engage the step, the module engagement surface is in an elevated position such that the engagement surface is spaced apart from the thermal interface member. When the ribs are longitudinally offset from the step, the module engagement surface is in a recessed position. The module engagement surface is in direct thermal engagement with the thermal interface member in the recessed position.

Optionally, the ribs may be elevated above an outer surface of the thermal interface member. The ribs may be aligned with the step to engage the step during insertion and extraction of the transceiver module. The ribs may be positioned to support the heat sink such that the module engagement surface is parallel to the thermal interface member.

Optionally, the transceiver module may include a plurality of thermal interface members and the ribs may be positioned adjacent each of the thermal interface members. The heat sink may include a plurality of steps configured to engage corresponding thermal interface members. Each step may be supported by a corresponding rib.

Optionally, the ribs may include an end rib and a side rib. The end rib may be positioned between a rear end of the housing and the thermal interface member. The side rib may be positioned longitudinally offset with respect to the end rib. The side rib may be positioned along a side of the thermal interface member. Both of the end rib and the side rib may be configured to engage the step simultaneously to support the heat sink in the elevated position. The end and side ribs may support the heat sink rearward of the thermal interface member and on both sides of the thermal interface member.

Optionally, the step may include a rail extending outward therefrom. The rail may be offset laterally to a side of the thermal interface member. The rail may be aligned with a corresponding rib extending along a side of the thermal interface member. The step may include a forward leading edge having a ramped transition portion extending between the heat sink surface and the module engagement surface. The step may include a rearward leading edge having a ramped transition portion extending between the heat sink surface and the module engagement surface. The rib may ride along the forward leading edge, the module engagement surface and the rearward leading edge to elevate the heat sink above the thermal interface member.

BRIEF DESCRIPTION OF THE DRAWINGS

FIG. 5 is a cross sectional view of the transceiver module coupled to the receptacle assembly.

FIG. 6 is a cross sectional view of the transceiver module in an intermediate position.

DETAILED DESCRIPTION OF THE INVENTION

Figure 1:
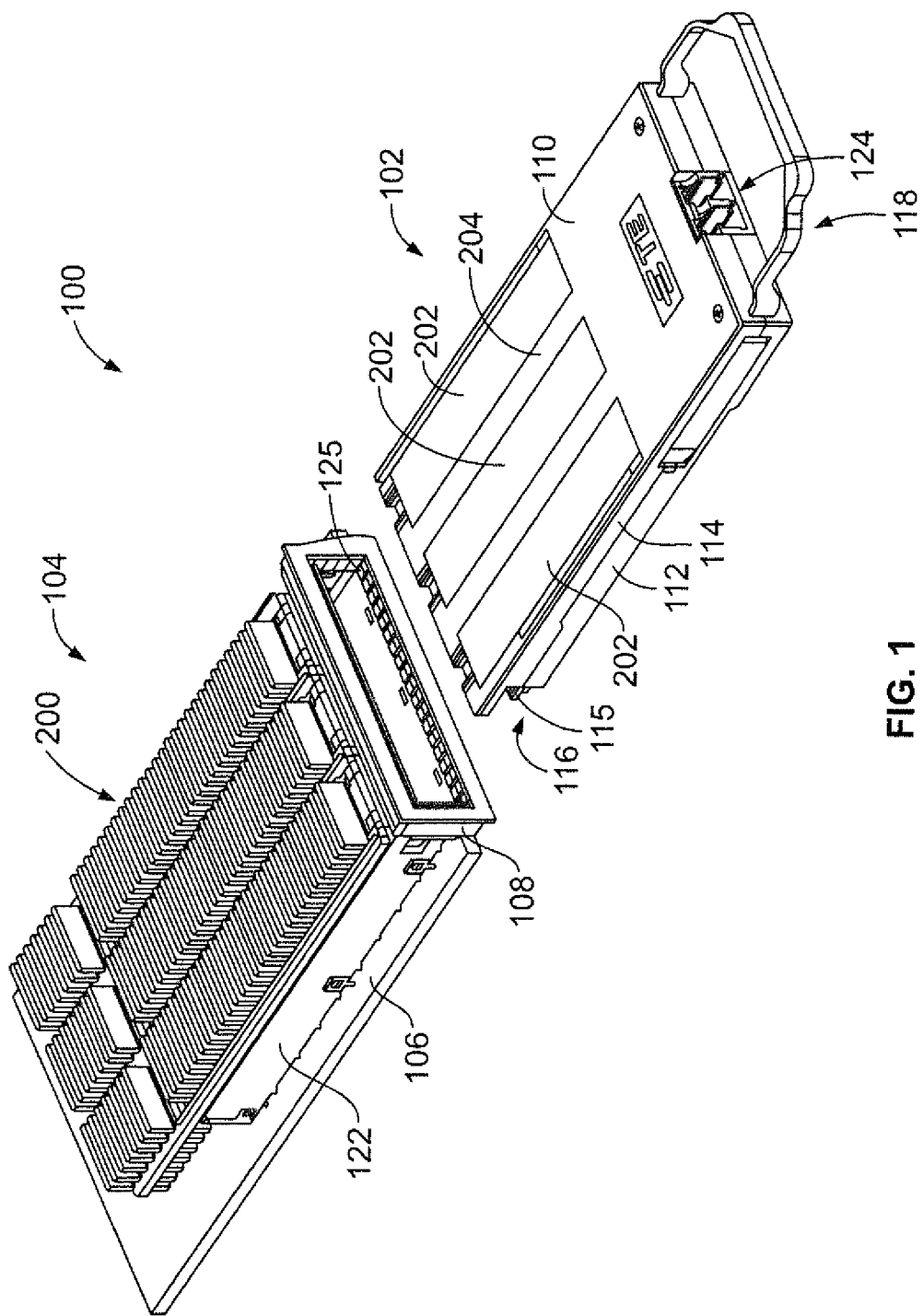
FIG. 1 illustrates a transceiver assembly formed in accordance with an exemplary embodiment.

FIG. 1 illustrates a transceiver assembly 100 formed in accordance with an exemplary embodiment. The transceiver assembly 100 is adapted to address, among other things, heat dissipation and electromagnetic shielding for components conveying data signals at high rates, such as data transmission rates of 10 gigabits per second (Gbps) or higher. It is appreciated, however, that the benefits and advantages of the subject matter described herein may accrue equally to other data transmission rates and across a variety of systems and standards. Therefore, while the subject matter is described and illustrated in the context of the transceiver assembly 100, the subject matter is not intended to be limited to the transceiver assembly 100, and the transceiver assembly 100 is therefore provided for purposes of illustration rather than limitation.

As shown in FIG. 1, the transceiver assembly 100 generally includes a transceiver module 102 configured for pluggable insertion into a receptacle assembly 104 that is mounted to a host circuit board 106, which, in turn, is mounted in a host system such as a router or computer (not shown). The host system typically includes a conductive chassis having a bezel 108 including an opening therethrough in substantial alignment with the receptacle assembly 104. The transceiver module 102 is inserted into the receptacle assembly 104 through the bezel opening.

In an exemplary embodiment, the transceiver module 102 includes a housing 110 including a base 112 and a cover 114 that are secured together to form a protective shell for one or more transceiver circuit boards 115 that are disposed within the housing 110. The transceiver circuit board 115 carries electronic circuitry and devices that perform transceiver functions in a known manner. An edge of the transceiver circuit board 115 is exposed through a rear end 116 of the housing 110, and the edge is pluggable into the receptacle assembly 104 as described below. The transceiver module 102 is adapted for installation into the receptacle assembly 104 such that a front end 118 of the transceiver module 102 is extended therefrom.

In general, the transceiver module 102 and receptacle assembly 104 may be used in any application requiring an interface between a host system and electrical or optical signals. The transceiver module 102 interfaces to the host system through the receptacle assembly 104 via a receptacle connector 120 (shown in FIG. 2) which is located within a receptacle guide frame 122, also referred to as a cage, of the receptacle assembly 104. The transceiver module 102 interfaces to an optical fiber or electrical cable (not shown) through a connector interface 124 at the front end 118 of the transceiver module 102. Optionally, the connector interface 124 may include a mechanism that cooperates with a fiber or cable assembly to secure the fiber or cable assembly to the transceiver module 102.

The transceiver module 102 and the receptacle assembly 104 reduce EMI emission through one or more of several EMI reduction features, including the guide frame 122 and one or more gaskets 125 coupled to the guide frame 122.

The transceiver assembly 100 provides thermal management and heat dissipation from the transceiver module 102 via a heat sink assembly 200 of the receptacle assembly 104. The heat sink assembly 200 directly engages the transceiver module 102 to dissipate heat therefrom. In an exemplary embodiment, the transceiver module 102 includes thermal interface members 202 on an outer surface 204 of the housing 110 of the transceiver module 102. The thermal interface members 202 define thermal interfaces with the heat sink assembly 200. In an exemplary embodiment, the transceiver assembly 100 includes features to protect the thermal interface members 202 from damage, such as from scraping, marring, wiping and the like, of the surface of the thermal interface members 202 during insertion and/or extraction of the transceiver module 102 from the receptacle assembly 104. For example, features are provided to disengage the heat sink assembly 200 from the thermal interface members 202 as the transceiver module is slid into and out of the receptacle assembly 104.

Figure 2:
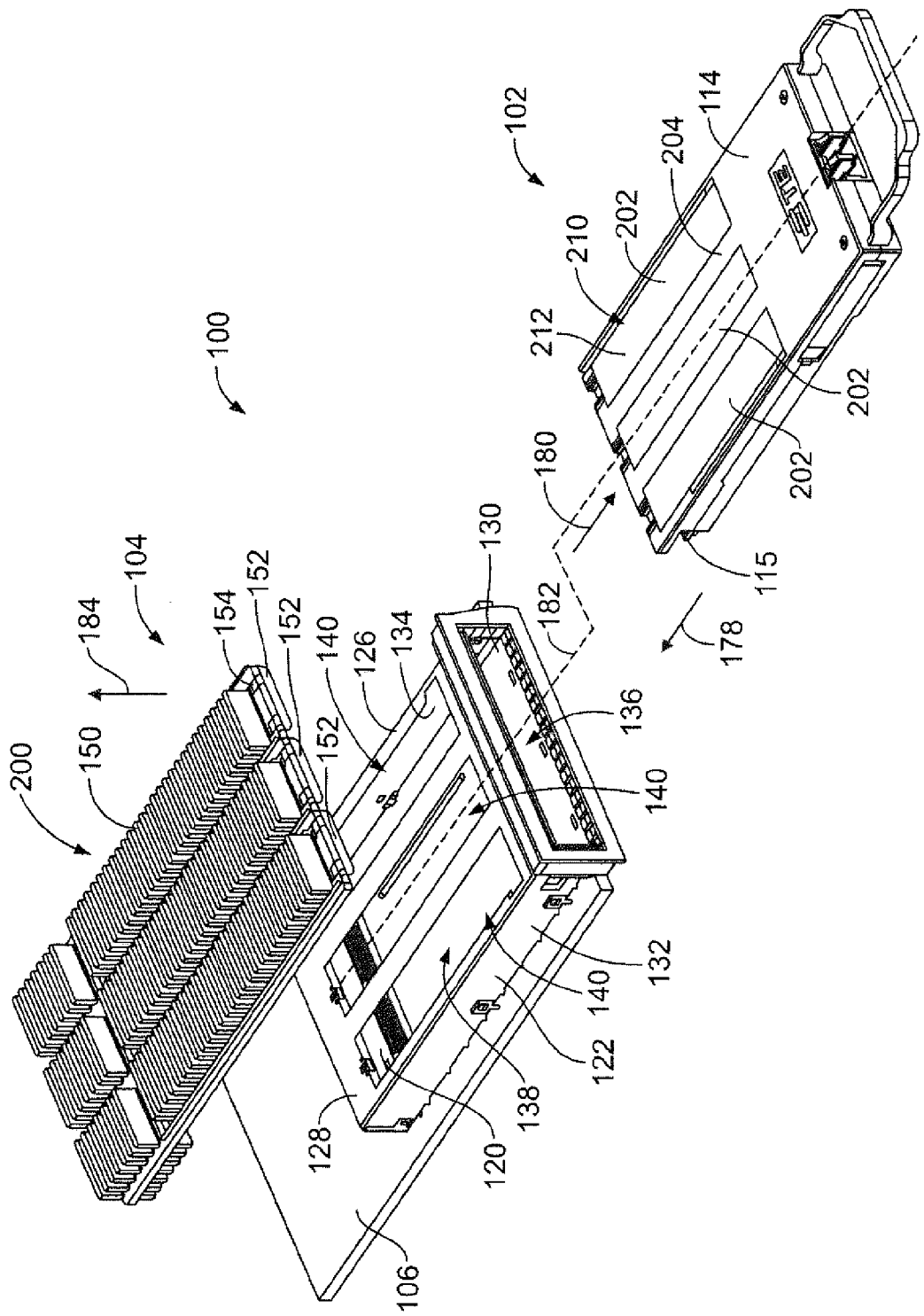
FIG. 2 is an exploded view of the transceiver assembly showing a heat sink assembly.

FIG. 2 is an exploded view of the transceiver assembly 100 showing the heat sink assembly 200 above the guide frame 122. The guide frame 122 includes a stamped and formed metal body 126 that defines a shell having a top wall 128, a bottom wall 130, and side walls 132, 134. Front edges of each of the top, bottom and side walls 128-134 surround a front opening 136 into the guide frame 122. The top wall 128, the bottom wall 130, and the side walls 132, 134 define a receptacle 138 therebetween for receiving the transceiver module 102 through the front opening 136 of the guide frame 122. The bottom wall 130 has a bottom opening to receive the receptacle connector 120. Optionally, the guide frame 122 may include compliant pins that are received within through-holes of the host circuit board 106 to provide a conductive path to ground of the host circuit board 106 and an equipment chassis. The host circuit board 106 includes a conductive surface provided thereon and formed as a sheet to underlie the receptacle assembly 104 to enhance the electromagnetic interference shielding. When the transceiver module 102 is inserted into the receptacle assembly 104, the host circuit board 106 and guide frame 122 provide conductive walls on all sides thereof for electrical shielding of the transceiver module 102.

The receptacle connector 120 is mounted on the host circuit board 106 of the host equipment along with the guide frame 122. The receptacle connector 120 receives an edge of the transceiver circuit board 115 that is carried by the transceiver module 102 when the transceiver module 102 is fully installed in the guide frame 122, thereby electrically connecting the transceiver module 102 to the host equipment.

The top wall 128 of the guide frame 122 has large openings 140 overlying the receptacle 138 that receives the heat sink assembly 200. The heat sink assembly 200 accesses the transceiver module 102 through the openings 140. The heat sink assembly 200 includes a heat sink 150 positioned to make physical contact with the transceiver module 102 when the transceiver module 102 is installed into the receptacle assembly 104. The heat sink assembly 200 includes clips 152 mounted over the heat sink 150 and secured to the guide frame 122. The clips 152 ensure that the heat sink 150 is loaded against the transceiver module 102 to facilitate thermal transfer from the transceiver module 102 to the heat sink 150. The heat sink 150 includes an engagement surface (described below) that faces and is located proximate the interior receptacle 138 of the guide frame 122. The engagement surface of the heat sink 150 is configured to physically contact and abut against the thermal interface members 202 of the transceiver module 102 when installed in the receptacle 138. The thermal interface members 202 are protected from damage during insertion and/or extraction of the transceiver module 102 from the receptacle assembly 104, such as by disengaging the engagement surface of the heat sink 150 from the thermal interface members 202 during insertion and extraction.

The clip 152 includes resilient spring members 154 secured over heat sink 150. The spring members 154 flex to permit the heat sink 150 to move outward away from the guide frame 122 when the transceiver module 102 is inserted and extracted. Then the transceiver module 102 is fully inserted in the receptacle assembly 104, the spring members 154 exert a desired force against the heat sink 150 to maintain a desired abutting interface to facilitate thermal transfer and heat dissipation from the transceiver module 102.

Figure 3:
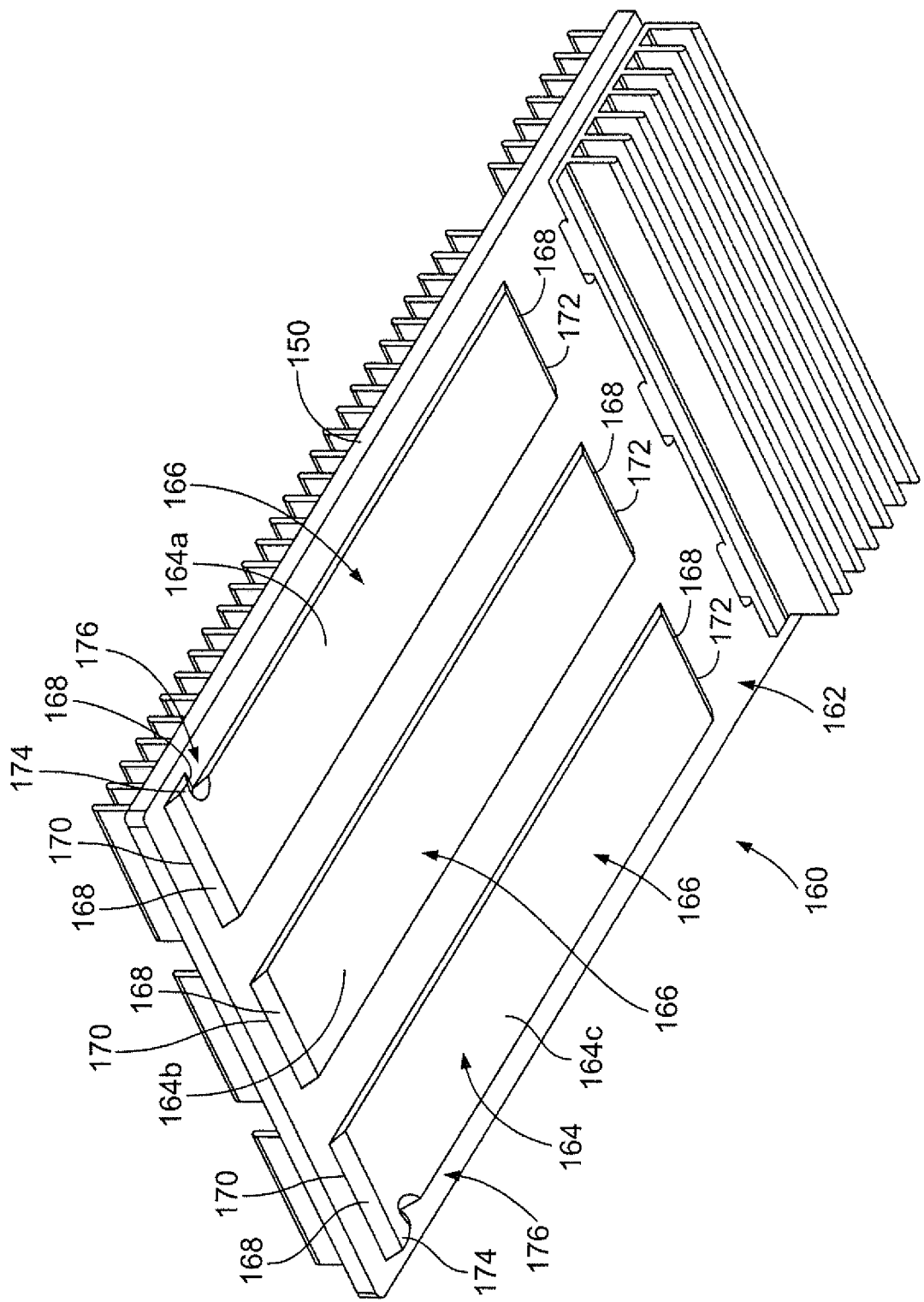
FIG. 3 illustrates a bottom perspective view of a heat sink of the heat sink assembly.

FIG. 3 illustrates a bottom perspective view of the heat sink 150. The heat sink 150 includes a heat sink surface 160, which may be a bottom surface of the heat sink 150. The heat sink surface 160 faces the transceiver module 102 and the thermal interface members 202 (both shown in FIG. 2). The heat sink surface 160 includes a peripheral surface 162 surrounding a plurality of steps 164. The steps 164 extend from the peripheral surface 162. Any number of steps 164, including a single step 164 or no steps, may be provided. The steps 164 each include a module engagement surface 166 that is generally planar and configured to engage the corresponding thermal interface member 202. The module engagement surfaces 166 are oriented parallel to, and non-coplanar with, the peripheral surface 162 to extend into the receptacle 138 (shown in FIG. 2) of the guide frame 122. The peripheral surface 162 surrounds the steps 164 on the peripheries or perimeters thereof, and the peripheral surface 162 is recessed relative to a plane extending along the module engagement surfaces 166.

The steps 164 include ramped transition portions 168 extending on forward and rearward leading edges 170, 172 of the steps 164. The ramped transition portions 168 are forward and rearward facing and are used to drive the steps 164 out of the receptacle 138 during insertion and extraction of the transceiver module 102.

In an exemplary embodiment, at least some of the steps 164 include rails 174 extending therefrom. The rails 174 form part of the steps 164 and are extensions of the steps 164. The rails 174 have outer surfaces that are coplanar with the module engagement surfaces 166. The rails 174 widen the steps 164 and include ramped leading and trailing transition portions. The leading ramped transition portions of the rails 174 may be continuous with the ramped transition portions 168 of the forward leading edges 170. The trailing ramped transition portions of the rails 174 may define ramped transition portions 168 of the step 164, however the trailing ramped transition portions 168 of the rails 174 may be longitudinally off-set from the ramped transition portions 168 of the rearward leading edge 172. In the illustrated embodiment, the outer steps (identified as 164a, 164c) include rails 174 at the outermost side edges thereof, while the inner step (identified as 164b) does not include any rails. The rails 174 extend outward from the steps 164, generally away from the inner step 164b. The rails 174 are positioned at the forward leading edge 170 of the steps 164. A window 176 is defined rearward of each rail 174 along the outer edge of the corresponding step 164. The rails 174 may be located at other positions in alternative embodiments.

With additional reference to FIG. 2, when assembled, the engagement surface 166 of the heat sink 150 rests within the interior receptacle 138 of the guide frame 122 at a level that interferes with an installation path of the transceiver module 102. The heat sink 150 is moved outward by the transceiver module 102 when the transceiver module 102 is loaded into the receptacle 138 in a loading direction 178 or removed from the receptacle 138 in an unloading direction 180, opposite the loading direction 178. The loading and unloading directions 178, 180 are generally parallel to a longitudinal axis 182 of the receptacle 138.

During loading of the transceiver module 102, the heat sink 150 is initially moved outward, in a lifting direction 184, to an elevated position or a non-engaging position. In the elevated position, the module engagement surfaces 166 do not engage the transceiver module 102 so the transceiver module 102 can be inserted without damaging the transceiver module 102. When the transceiver module is fully loaded, the heat sink 150 is released and moved to a released position or an engaging position, in which the module engagement surfaces 166 engage the corresponding thermal interface members 202. The clip 152 presses on the heat sink 150 to provide a spring force against the heat sink 150, which presses the heat sink 150 against the transceiver module 102. During unloading of the transceiver module 102, the heat sink 150 is similarly moved outward in the lifting direction 184 to the elevated or non-engaging position so the transceiver module 102 can be removed without damaging the thermal interface members 202.

The thermal interface members 202 are disposed on the cover 114 of the transceiver module 102. When engaged by the heat sink 150, the thermal interface members 202 are compressed between the module engagement surfaces 166 and the cover 114. Optionally, the thermal interface members 202 may be recessed in pockets 210 in the cover 114 such that outer surfaces 212 of the thermal interface members 202 are generally coplanar with the outer surface 204 of the cover 114. Recessing the thermal interface members 202 reduces the height of the transceiver module 102 and thus lowers the vertical position of the heat sink 150, making a lower profile system as compared to a system that does not recess the thermal interface members 202 in pockets.

Figure 4:
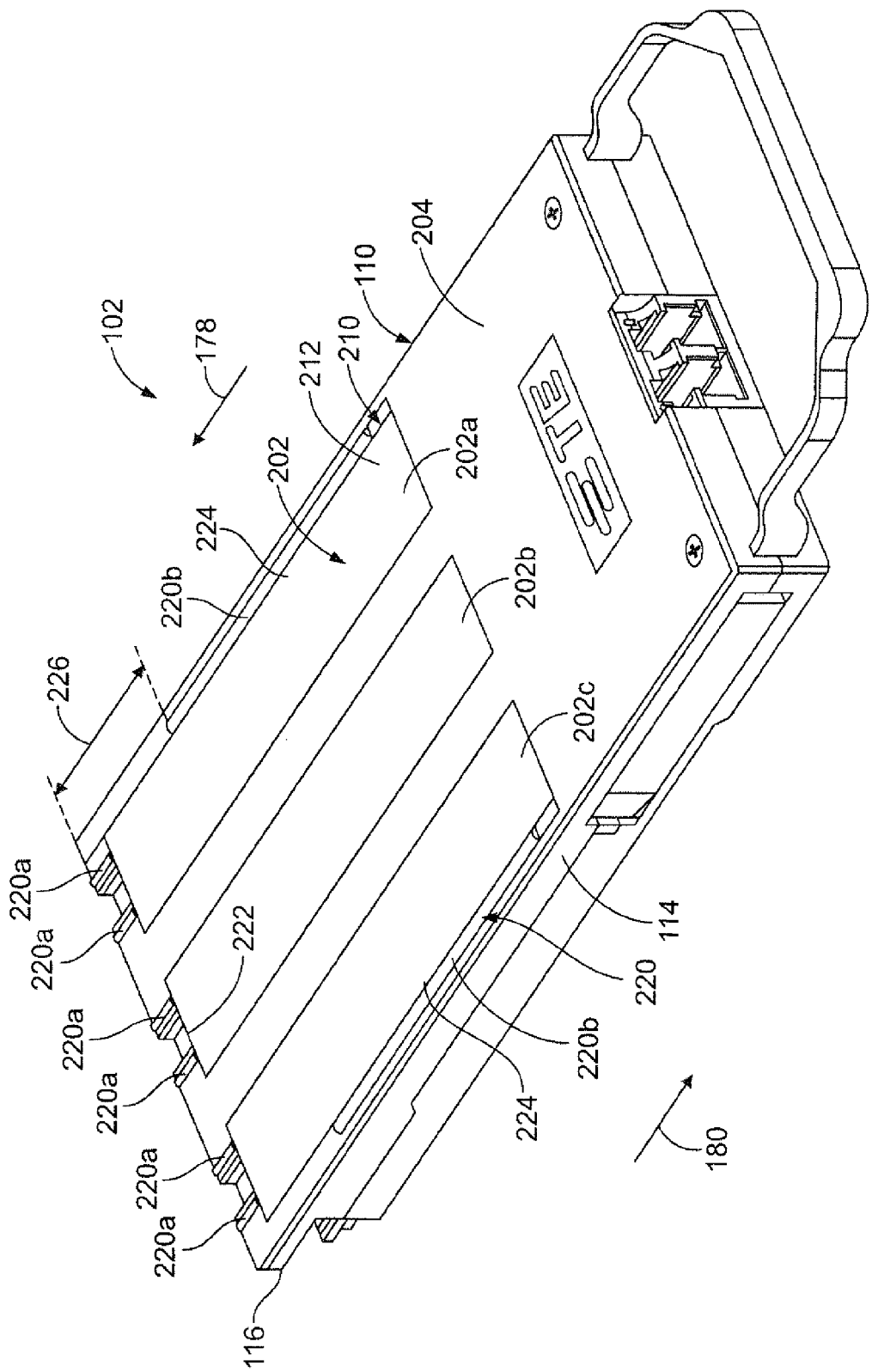
FIG. 4 is a top perspective view of the transceiver module showing thermal interface members.

FIG. 4 is a top perspective view of the transceiver module 102 showing the thermal interface members 202 in the pockets 210 on the outer surface 204 of the cover 114. Optionally, rather than having multiple, discrete thermal interface members 202, a single thermal interface member 202 may be used in an alternative embodiment. The thermal interface members 202 may be manufactured from any type of thermally conductive material as is known in the industry for interfacing with the heat sink 150 (shown in FIG. 3).

In an exemplary embodiment, the transceiver module 102 includes ribs 220 extending from the outer surface 204 of the cover 114. The ribs 220 are elevated above the outer surface 204. The ribs 220 are elevated above the outer surfaces 212 of the thermal interface members 202. The ribs 220 operate to lift the heat sink 150 above the thermal interface members 202 during insertion and extraction of the transceiver module 102 to protect the thermal interface members 202 from damage. In an exemplary embodiment, the ribs 220 engage corresponding steps 164 (shown in FIG. 3) of the heat sink 150 to lift the heat sink 150 out of engagement with the thermal interface members 202. The ribs 220 are located in-line with the steps 164 to ensure that the ribs 220 engage the steps 164 during insertion and extraction of the transceiver module 102. The ribs 220 may have any size or shape to achieve lifting of the heat sink 150. Optionally, the ribs 220 may be elongated longitudinally along the loading and unloading directions 178, 180 such that the heat sink 150 rides along the ribs 220 as the transceiver module 102 is inserted and extracted.

In an exemplary embodiment, at least some of the ribs 220 are provided at ends 222 of the thermal interface members 202. Such ribs 202 may be referred to as end ribs 220a. The end ribs 220a are positioned between the rear end 116 of the housing 110 and the thermal interface members 202. Optionally, the end ribs 220a may extend to the rear end 116. The end ribs 220a are laterally aligned with the thermal interface members 202, but are longitudinally off-set with respect to the thermal interface members 202. The end ribs 220a initially engage the steps 164 of the heat sink 150 during insertion of the transceiver module 102, driving the heat sink 150 upward to clear the thermal interface members 202. During insertion, the end ribs 220a engage the forward leading edge 170 (shown in FIG. 3) of the corresponding step 164. The end ribs 220 ride along the transition portions 168 (shown in FIG. 3), forcing the heat sink 150 outward in the lifting direction 184 (shown in FIG. 2). Eventually, the end ribs 220a ride down the rearward ramped transition portions 168 of the steps 164. Once the end ribs 220a clear the rearward leading edges 172 (shown in FIG. 3) of the steps 164, the module engagement surfaces 166 are lowered into engagement with the thermal interface members 202.

In an exemplary embodiment, at least some of the ribs 220 extend along sides 224 of the thermal interface members 202. Such ribs 220 may be referred to as side ribs 220b. The side ribs 220b are longitudinally aligned with the thermal interface members 202, but are laterally off-set with respect to the thermal interface members 202. The side ribs 220b are longitudinally off-set from the end ribs 220a. In the illustrated embodiment, the side ribs 220b are provided along the outermost sides 224 of the outer thermal interface members 202a, 202c. In the illustrated embodiment, the inner thermal interface member 202b does not have any side ribs 220b associated therewith. The side ribs 220b extend longitudinally. In an exemplary embodiment, the side ribs 220b are spaced a distance 226 from the rear end 116 of the housing 110. The side ribs 220b are configured to engage the rails 174 as the transceiver module 102 is inserted and extracted from the receptacle 138. For example, the rails 174 are offset laterally to a side of the thermal interface members 202 and are aligned with corresponding side ribs 220b. The side ribs 220b engage the ramped transition portions 168 of the rail 174 during insertion and extraction to remove the heat sink 150 from the receptacle 138. When the transceiver module 102 is fully loaded into the receptacle 138, the side ribs 220b are located in the windows 176 (shown in FIG. 3) generally between the rails 174 and the rear end 116 of the housing 110.

The side ribs 220b help to hold the heat sink 150 parallel to the transceiver module 102 and the thermal interface members 202, without which, the heat sink 150 may tilt or angle downward causing damage to the thermal interface members 202. For example, once the end ribs 220a pass the center of gravity of the heat sink 150 (e.g. the midpoint of the steps 164), the clip 152 may tend to force the front of the heat sink 150 downward. The side ribs 220b are longitudinally offset from the end ribs 220a to support the rails 174 prior to the heat sink 150 being forced downward by the clip 152. In an exemplary embodiment, the end ribs 220a and side ribs 220b simultaneously support the heat sink 150 rearward of the thermal interface members and on both sides of the thermal interface members 202 when the transceiver module 102 is partially loaded into the receptacle assembly 104.

During use, when the ribs 220 are longitudinally aligned with and engage the steps 164, the module engagement surfaces 166 are in the elevated position such that the module engagement surfaces 166 are spaced apart from the thermal interface members 202. When the ribs 220 are longitudinally offset from the steps 164, the module engagement surfaces 166 are in the recessed position. The module engagement surfaces 166 are in direct thermal engagement with the thermal interface members 202 in the recessed position.

FIG. 5 is a cross sectional view of the transceiver module 102 coupled to the receptacle assembly 104. The transceiver module 102 is shown in a fully mated position. An end 230 of the transceiver circuit board 115 is received in a slot 232 of the receptacle connector 120 which is mechanically and electrically mounted to the host circuit board 106. The receptacle connector 120 includes electrical contacts that contact conductive terminations on the end of the transceiver circuit board 115 to establish electrical connection to conductive paths on the host circuit board 106.

When the transceiver module 102 is fully mated, the heat sink 150 is seated against the transceiver module 102. The module engagement surface 166 engages the thermal interface member 202 to provide a direct thermal path between the transceiver module 102 and the heat sink 150. As shown in FIG. 5, the ribs 220 of the transceiver module 102 are positioned immediately forward of the step 164 (e.g. the ramped transition portions 168 of the rearward leading edge 172 and the rail 174, shown in detail in FIG. 3). Upon extraction, as the transceiver module 102 is pulled in the unloading direction 180, the ribs 220 force the heat sink 150 outward in the lifting direction 184 to provide clearance between the module engagement surface 166 and the thermal interface member 202. As the transceiver module 102 is extracted, the heat sink 150 does not scrape or damage the thermal interface member 202.

FIG. 6 is a cross sectional view of the transceiver module 102 in an intermediate position. The transceiver module 102 is in the intermediate position during insertion, such as prior to fully mating the transceiver module 102 with the receptacle connector 120. The transceiver module 102 is in the intermediate position during extraction, such as prior to fully removing the transceiver module 102 from the receptacle 138. In the intermediate position, the heat sink 150 is elevated off of the thermal interface members 202 (shown in FIG. 4). The heat sink 150 does not scrape across the thermal interface members 202 as the transceiver module 102 is inserted and extracted. The ribs 220a, 220b function to lift the heat sink 150 to provide clearance for the transceiver module 102 to move freely within the receptacle 138 without engaging the module engagement surface 166.

In an exemplary embodiment, the ribs 220a, 220b support the heat sink 150 at two different axially offset locations. For example, the heat sink 150 may be supported proximate to both the forward and rearward leading edges 170, 172 thereof by the side ribs 220b and end ribs 220a, respectively. At some stages, the heat sink 150 may only be supported by the end ribs 220a, such as when the side ribs 220b are positioned forward of the rails 174. Once the ribs 220a, 220b clear the leading edges 170 or 172, the steps 164 of the heat sink 150 are lowered back into the receptacle 138.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means—plus-function format and are not intended to be interpreted based on 35 U.S.C. §112, sixth paragraph, unless and until such claim limitations expressly use the phrase "means for" followed by a statement of function void of further structure.

What is claimed is:

1. A transceiver assembly comprising:
  a transceiver module comprising a housing, the housing having an outer surface, the outer surface having ribs extending therefrom, the transceiver module having a thermal interface member on the outer surface, the thermal interface member being positioned proximate the ribs; and
  a receptacle assembly comprising a guide frame having a receptacle receiving the transceiver module in a loading direction, the receptacle extending longitudinally along the loading direction, the receptacle assembly comprising a receptacle connector in the receptacle being electrically coupled with the transceiver module, the receptacle assembly comprising a heat sink and a clip coupling the heat sink to the guide frame, the heat sink having a heat sink surface facing the thermal interface member, the heat sink surface having a step extending from the heat sink surface, the step having a module engagement surface configured to be in direct thermal engagement with the thermal interface member;

wherein the ribs ride along the step during insertion into and removal from the receptacle of the transceiver module, wherein when the ribs are longitudinally aligned with and engage the step, the module engagement surface is in an elevated position such that the engagement surface is spaced apart from the thermal interface member, and when the ribs are longitudinally offset from the step, the module engagement surface is in a recessed position, the module engagement surface being in direct thermal engagement with the thermal interface member in the recessed position.

2. The transceiver assembly of claim 1, wherein the ribs are elevated above an outer surface of the thermal interface member.

3. The transceiver assembly of claim 1, wherein the ribs are aligned with the step to engage the step during insertion and extraction of the transceiver module.

4. The transceiver assembly of claim 1, wherein the ribs are positioned to support the heat sink such that the module engagement surface is parallel to the thermal interface member.

5. The transceiver assembly of claim 1, wherein the transceiver module includes a plurality of thermal interface members, the ribs being positioned adjacent each of the thermal interface members, and wherein the heat sink includes a plurality of steps configured to engage corresponding thermal interface members, each step being supported by a corresponding rib.

6. The transceiver assembly of claim 1, wherein the ribs comprise an end rib and a side rib, the end rib being positioned between a rear end of the housing and the thermal interface member, the side rib being positioned longitudinally offset with respect to the end rib, the side rib being positioned along a side of the thermal interface member, wherein both of the end rib and the side rib are configured to engage the step simultaneously to support the heat sink in the elevated position.

7. The transceiver assembly of claim 1, wherein the ribs comprise end ribs and side ribs, the end ribs and side ribs supporting the heat sink rearward of the thermal interface member and on both sides of the thermal interface member.

8. The transceiver assembly of claim 1, wherein the step includes a rail extending outward therefrom, the rail being offset laterally to a side of the thermal interface member, the rail being aligned with a corresponding rib extending along a side of the thermal interface member.

9. The transceiver assembly of claim 1, wherein the step includes a forward leading edge having a ramped transition portion extending between the heat sink surface and the module engagement surface, the step including a rearward leading edge having a ramped transition portion extending between the heat sink surface and the module engagement surface, the rib riding along the forward leading edge, the module engagement surface and the rearward leading edge to elevate the heat sink above the thermal interface member.

10. A transceiver assembly comprising:
a transceiver module comprising a housing, the housing having an outer surface, the housing having a rear end, the transceiver module having a thermal interface member on the outer surface, the outer surface having end ribs provided between the thermal interface member and the rear end, the outer surface having side ribs extending along a side of the thermal interface member; and
a receptacle assembly comprising a guide frame having a receptacle receiving the rear end of the transceiver module in a loading direction, the receptacle extending longitudinally along the loading direction, the receptacle assembly comprising a receptacle connector in the receptacle being electrically coupled with the transceiver module, the receptacle assembly comprising a heat sink and a clip coupling the heat sink to the guide frame, the heat sink having a heat sink surface facing the thermal interface member, the heat sink surface having a step extending from the heat sink surface, the step having a module engagement surface configured to be in direct thermal engagement with the thermal interface member;

wherein the end ribs and side ribs ride along the step during insertion into and removal from the receptacle of the transceiver module, the end ribs and side ribs supporting the heat sink rearward of the thermal interface member and on both sides of the thermal interface member when the end ribs and the side ribs engage the step;

wherein, when the end ribs and the side ribs are longitudinally aligned with and engage the step, the module engagement surface is in an elevated position such that the module engagement surface is spaced apart from the thermal interface member, and wherein, when the ribs are longitudinally offset from the step, the module engagement surface is in a recessed position, the module engagement surface being in direct thermal engagement with the thermal interface member in the recessed position.

11. The transceiver assembly of claim 10, wherein the end ribs and the side ribs are elevated above an outer surface of the thermal interface member.

12. The transceiver assembly of claim 10, wherein the end ribs and the side ribs are aligned with the step to engage the step during insertion and extraction of the transceiver module.

13. The transceiver assembly of claim 10, wherein the end ribs and the side ribs are positioned to support the heat sink such that the module engagement surface is parallel to the thermal interface member.

14. The transceiver assembly of claim 10, wherein the transceiver module includes a plurality of thermal interface members, each of the thermal interface members having end ribs longitudinally aligned therewith, and wherein the heat sink includes a plurality of steps configured to engage corresponding thermal interface members, each step being supported by a corresponding end rib during insertion and extraction of the transceiver module from the receptacle assembly.

15. The transceiver assembly of claim 10, wherein the end ribs are positioned between a rear end of the housing and the thermal interface member and the side ribs are positioned longitudinally offset with respect to the end ribs, the side ribs being laterally offset from the thermal interface member along a side of the thermal interface member, wherein both the end ribs and the side ribs are configured to engage the step simultaneously to support the heat sink in the elevated position.

16. The transceiver assembly of claim 10, wherein the step includes a rail extending outward therefrom, the rail being offset laterally to a side of the thermal interface member, the rail being aligned with a corresponding side rib extending along a side of the thermal interface member.

17. The transceiver assembly of claim 10, wherein the step includes a forward leading edge having a ramped transition portion extending between the heat sink surface and the module engagement surface, the step including a rearward leading edge having a ramped transition portion extending between the heat sink surface and the module engagement surface, the end ribs riding along the forward leading edge, the module engagement surface and the rearward leading edge to elevate the heat sink above the thermal interface member.

18. A transceiver assembly comprising:
   a transceiver module comprising a housing, the housing having an outer surface, the outer surface having ribs extending therefrom, the transceiver module having a thermal interface member on the outer surface, the thermal interface member being positioned proximate the ribs; and
   a receptacle assembly comprising a guide frame having a receptacle receiving the transceiver module in a loading direction, the receptacle extending longitudinally along the loading direction, the receptacle assembly comprising a receptacle connector in the receptacle being electrically coupled with the transceiver module, the receptacle assembly comprising a heat sink and a clip coupling the heat sink to the guide frame, the heat sink having a heat sink surface facing the thermal interface member, the heat sink surface having a step extending from the heat sink surface, the step having a module engagement surface configured to be in direct thermal engagement with the thermal interface member, the step including a rail offset laterally to a side of the step, the rail being aligned with a corresponding rib extending along a side of the thermal interface member;
   wherein the ribs ride along the step and the rail during insertion into and removal from the receptacle of the transceiver module, wherein when the ribs are longitudinally aligned with and engage the step, the module engagement surface is in an elevated position such that the engagement surface is spaced apart from the thermal interface member, and when the ribs are longitudinally offset from the step, the module engagement surface is in a recessed position, the module engagement surface being in direct thermal engagement with the thermal interface member in the recessed position.

19. The transceiver assembly of claim 18, wherein the ribs are positioned to support the heat sink such that the module engagement surface is parallel to the thermal interface member.

20. The transceiver assembly of claim 18, wherein the ribs comprise an end rib and a side rib, the end rib being positioned between a rear end of the housing and the thermal interface member, the side rib being positioned longitudinally offset with respect to the end rib, the side rib being positioned along a side of the thermal interface member, wherein the end rib is configured to engage the step and the side rib is configured to engage the rail to support the heat sink in the elevated position.

* * * * *